United States Patent [19]

Guile et al.

[11] 3,940,279

[45] Feb. 24, 1976

[54] SIZE-GRADED TERNARY BATCH FOR BONDED BASIC REFRACTORY SHAPES

[75] Inventors: Donald L. Guile, Horseheads; Robert K. Smith, Corning, both of N.Y.

[73] Assignee: Corning Glass Works, Corning, N.Y.

[22] Filed: June 17, 1974

[21] Appl. No.: 480,284

[52] U.S. Cl. .................................. 106/58; 106/63
[51] Int. Cl.$^2$ ........................................ C04B 35/04
[58] Field of Search ........................ 106/58, 61, 63

[56] References Cited
UNITED STATES PATENTS

| | | | |
|---|---|---|---|
| 2,572,688 | 10/1951 | Austin | 106/58 |
| 3,141,784 | 7/1964 | King et al. | 106/58 |
| 3,262,795 | 7/1966 | Davies et al. | 106/58 |

Primary Examiner—J. Poer
Attorney, Agent, or Firm—Barry S. Bissell; Richard N. Wardell; Clarence R. Patty, Jr.

[57] ABSTRACT

A refractory of fused or dead-burned dolomitic grain bonded with fine magnesite. The dolomitic grain is divided into one coarse and one intermediate particle size fraction in the batch, while the magnesite is alone in the fine fraction. The fine, intermediate and coarse fractions are separated by large discrete gaps in the size distribution of particles resulting in a burned refractory of high hot strength and corrosion resistance to slags in basic oxygen furnaces. The width of each large gap in the particle size distribution is at least equivalent to the gap created by removing from a ground raw material batch, with a continuous particle size distribution, the particles retained on at least three consecutive primary Tyler sieves after screening (sizing) the batch.

9 Claims, No Drawings

SIZE-GRADED TERNARY BATCH FOR BONDED BASIC REFRACTORY SHAPES

BACKGROUND OF INVENTION

The basic refractories of the present invention are suitable for use in lining high wear areas of the steelmaking basic oxygen furnaces (BOF). The current practice for lining a BOF requires the use of premium products in the high wear areas to attain a balanced life of all refractories in the furnace. Presently, the premium grade refractories are made from dead-burned magnesite which has been crushed, sized, rebonded by pressing, and fired to high temperatures. Penetration by basic slags and metal leading to rapid corrosion of the refractories is prevented by impregnating the refractory shapes with tar or other coal products which will coke when heated. The coking process fills open pores and forms a layer which repels attack by the furnace slags.

Although the tar-impregnated magnesite (in the art and herein used synonymously with magnesia, both terms commonly describing bodies with periclase as the stable crystalline form) have become widely used, there is a continuing interest in decreasing the cost of refractory material consumed per furance heat or per ton of steel produced. Lower refractory cost per ton of steel can be obtained by replacing current refractories with a cheaper refractory of equivalent life or by replacing with a refractory having superior properties and life which will more than compensate for any greater initial cost.

Of course, a refractory with superior properties and lower cost is always an ultimate goal. With this in mind, experimenters have moved in the direction of dolomite as a replacement or a partial replacement for the MgO in magnesite brick. This replacement accomplishes a cost reduction, because not only is dolomite more readily available commercially, but the energy requirements for one common method of producing high purity magnesite (from magnesium hydrate produced by a treatment of sea water or other brine) are extremely high. In moving toward dolomite as a refractory raw material, we are moving toward the consumption of less energy in both producing the raw material and in burning the refractory.

The use of dolomite, dead-burned dolomite (a mixture of periclase and calcia) or fused dolomite (a solidified melt of dolomite or equivalent calcia and magnesia) with or without excess magnesia is not without its problems. Perhaps the chief problem involves hydration of the dolomite or dead-burned dolomite grains to form calcium hydroxide with an incident volume expansion and weakening of the body. Fused dolomitic grains have been afforded more attention because of their increased hydration resistance but they still suffer somewhat from hydration. Accounts of fused dolomitic refractory and grain can be found in U.S. Pat. Nos. 3,540,899 and 3,262,795. Both suggest improvements relating to the art of fusion casting basic refractories.

Finally, the steel production measures of a good refractory (number of heats or tons of steel per brick life) are generally not reproducible in the laboratory for evaluation of samples. Therefore, the properties of corrosion/erosion resistance to synthetic basic slags and hot strength (modulus of rupture, usually at 1340°C unless specified otherwise) provide the quantitative means of comparing laboratory samples. Experience in the art has determined that reliance on these two tests as initial indications of potential furnace life is well founded.

PRIOR ART

Use of fused dolomitic grain (and dead-burned dolomitic grain) bonded with fine magnesia has been suggested by prior experimenters. For example U.S. Pat. No. 3,262,795 suggests a fused refractory of 50–95% MgO and 5–50% CaO, optionally comminuted and bonded with magnesia fines (reference to the bonding material of U.S. Pat. No. 3,060,000). The patent discloses a size grading of −4+10 mesh (30%), −10+28 mesh (35%) and −28 mesh (35%), preferably 20% of total batch passing a 325 mesh screen. (For refractories using dead-burned grain see U.S. Pat. No. 3,060,042 and U.S. Pat. No. 3,141,784.)

Prevailing standards for raw material particle sizing in the refractory industry prescribe either continuous particle size distribution or gap size distribution in which some particle size fractions are eliminated from the continuous size distribution batch. The present invention is concerned with a double gap sizing situation in which two discrete proportioned gaps are required between the three size fractions.

Several references deal with a double gap sizing in the preparation of various basic refractory batches. U.S. Pat. No. 2,255,020 concerns a refractory comprising 20–65% −4+12 mesh dolomite, 15–40% −18+30 mesh dead-burned magnesia and 20–40% −100 mesh dolomite. Two gaps are present but the smallest particle allowed in the coarse fraction (12 mesh) is less than two times the size of the maximum particle size allowed in the intermediate fraction (18 mesh). U.S. Pat. No. 2,572,688 deals with a chemically bonded, wholly magnesia refractory with a particle size distribution of −6+14 mesh (40%), −20+40 (20%), and −200 mesh (38%). Again there is a double gap in the distribution, but the ratio of the minimally sized coarse particle to the maximally sized intermediate particle is only 2. U.S. Pat. No. 2,252,317 discloses a magnesium orthosilicate refractory with a batch size distribution of particles comprising 35–50% −3½+7 mesh, 17–22% −16+32 mesh and 33% −65 mesh, yielding a ratio of minimally sized intermediate particle to maximally sized fine particle of less than 2.5.

Literature references for three component systems suggest possible size distributions which will yield the densest mixture. For example, Westman and Hugill suggest a distribtuion of approximately 21% fine, 16.5% medium, and 62.5% coarse (J. Amer. Cer. Soc. 13:767, 777 and FIG. 8). McGreary (for 7, 60, and 400 mesh spherical particles) suggests 23% fine, 10% medium, and 67% coarse (J. Amer. Cer. Soc. 44:513, et. seq.). These suggestions for densest packing are dependent upon the size ratio of particles in the three fractions but are sufficient to show that at least 60% coarse, and not more than 20% medium or 25% fines are necessary for the theoretically densest packing. These latter references are cited to highlight the divergence of the present invention from previous studies of particle packing. The particle distributions of the present invention are removed from the distributions suggested by the prior art for "perfect packing". With the new distribution, the inventors have been able to achieve better bonding between particle fractions and better strength and corrosion properties in the burned refractory.

SUMMARY

It is the object of the present invention to provide a burned basic refractory which excels in hot strength and corrosion resistance in BOF use.

It is another object of the invention to provide such a basic refractory using raw materials which are less expensive than those commonly used in present magnesite refractories used in the BOF.

It is a further object to provide a rebonded fused or dead-burned dolomitic grain refractory with the dolomitic grain making up coarse and intermediate raw material fractions and magnesia making up the fine, bonding fraction.

In particular, it is the object of the present invention to provide a refractory raw material batch with a novel size distribution of particles which results in a dense packing and superior bonding between coarse grains and consequently a burned refractory of high corrosion resistance and hot strength.

In accordance with the objectives, the invention is a proportioned, size-graded refractory raw material batch and resulting compacted and burned refractory produced therefrom. The batch comprises at least one fused or dead-burned dolomitic grain and a fine grained dead-burned magnesite. The dolomitic grain makes up two particle size fractions, the fractions collectively being substantially all −4+65 Tyler mesh (preferably +35 Tyler mesh) and the MgO makes up the fine fraction (−100 Tyler mesh, but preferably 75% of the fines pass a 325 Tyler mesh screen).

The dolomitic grain consists essentially of 50–67% MgO, 33–50% CaO and preferably at least 98% MgO + CaO. A fused and crushed mixture of 70% dolomite and 30% MgO, resulting in an analytical oxide composition (excluding minor impurities) of 59% MgO and 41% CaO, is preferred. Oxides of magnesium and calcium may be substituted for the dolomite but this negates a cost saving resulting from the use of dolomite as a raw material.

The invention herein is the size distribution of the raw material particles in the refractory batch. Specifically, three size fractions are separated by two discrete gaps in the size distribution of particles. The minimum size of each gap, in terms of the Tyler sieve series, is equivalent to the size of the gap created by removing from the batch the raw material which would be retained on at least three consecutive primary Tyler sieves after screening the raw materials. By primary sieves we mean those sieves of the Tyler Standard $\sqrt{2}$ sequence listed in Table I, each of whose openings are related to the next finer screen opening by a factor of $\sqrt{2}$. The opening of the fourth consecutive primary screen would be related to the opening of the first screen by a factor of $(\sqrt{2})^3$ or $2\sqrt{2}$.

TABLE I

| Tyler Screen Series (Primary Sieves) | |
|---|---|
| Mesh Per Inch | Opening Size (Inches) |
| 4 | 0.1852 |
| 6 | 0.1312 |
| 8 | 0.0928 |
| 10 | 0.0656 |
| 14 | 0.0464 |
| 20 | 0.0328 |
| 28 | 0.0232 |
| 35 | 0.0164 |
| 48 | 0.0116 |
| 65 | 0.0082 |
| 100 | 0.0058 |
| 150 | 0.0041 |
| 200 | 0.0029 |

If the three fractions in the refractory batch are defined as −A+B (coarse dolomitic fraction), −C+D (intermediate dolomitic fraction) and −F (fine MgO fraction), where A, B, C, D and F are the sequentially finer sieve openings in inches, then the two gaps (−B+C, −D+F) between the three fractions are established by defining the relation between the end members. Since we want to eliminate the particles retained on at least three consecutive primary Tyler screens, the end members must be related by at least a factor of $2\sqrt{2}$ and therefore: $B \geq 2\sqrt{2}\, C$, $D \geq 2\sqrt{2}\, F$. The inventors further require that the coarse and intermediate fractions be in the range of −4+65 Tyler mesh (preferably +35 Tyler mesh) and the fine fraction be −100 Tyler mesh (preferably 75% of which is −325 Tyler mesh).

For effective bonding in the burned refractory, the batch is proportioned 40–50% coarse, 20–30% intermediate and 25–35% fine. This proportion varies from the theoretical proportion for densest packing according to the previously mentioned references, in that excess fines and intermediates are present relative to the quantities required therein for perfect packing. "Perfect" packing in a triaxial system implies in simplest terms the type of packing associated with intermediate size particles filling the interstices between coarse particles, and fine particles then filling the interstices between intermediate and coarse particles. According to the present invention more than sufficient MgO fines to fill the interstices are present and few coarse or intermediate grains are in contact with each other. This excess of fines and relative absence of coarse-coarse grain contact is thought to contribute to a firm bond between dolomitic grains and to result in the desirable hot strength and corrosion resistance properties. Additionally, the excess MgO fines separating coarse fused dolomitic grains are thought to bond with the MgO phase in the dolomitic grains and form a bridging between grains, a bonding and bridging which would be lost with coarse grain contact.

According to the invention at least one fused or dead-burned dolomite grain (with or without excess MgO) is sized into two fractions, one coarse fraction and one intermediate fraction. The range of particle sizes within each fraction is not critical but (if we equate the particle size with the size of the sieve opening) the size of the smallest grain in the coarse fraction should be at least $2\sqrt{2}$ times the size of the largest particle in the intermediate fraction. The same holds true for the intermediate fraction of dolomitic grain and the fine fraction of MgO; that is, the smallest particle in the intermediate fraction should be at least $2\sqrt{2}$ times the largest particle in the fine fraction. Other boundary conditions require fines to be −100 Tyler mesh, the intermediate particles to be +65 Tyler mesh, and coarse particles to be −4 Tyler mesh.

A preferred particle size distribution is −4+10 (coarse dolomitic grain), −28+35 (intermediate dolomitic grain) and −100 (fine MgO). The opening on the 10 mesh screen (0.0656 inch) is $2\sqrt{2}$ times the opening on the 28 mesh screen (0.0232 inch) and the opening on the 35 mesh screen (0.0164 inch) is $2\sqrt{2}$ times the opening on the 100 mesh screen (.0058 inch).

For our purposes in defining the gap in the particle size distribution, we have assumed, in a manner conventional in the art, that the largest particle (or largest allowed particle) in a fraction is the same size as the opening on the finest screen which substantially all particles of the fraction pass and the smallest particle (or smallest allowed particle) in a fraction is the same size as the opening on the coarsest screen which substantially no particles of the fraction pass.

With the variance in shape of particles and the realities of screening (sizing) operations, especially on a production basis, some particles with diameters in the gaps will nevertheless find their way into the wrong fraction. For example, it would not be unrealistic to find 5% oversize, or more commonly, undersize particles in a fraction. Therefore, it would be ideal to have the smallest particle be at least $2\sqrt{2}$ times the size of the coarsest particle in the next finer raw material fraction, but it would not be commercially feasible. It is realistic and more definitive to say that each of the two proper gaps are produced between the three fractions in normal screening operations by removing from the whole batch the raw material which is the equivalent of that retained on at least 3 consecutive primary Tyler screens after screening. In creating the preferred distribution of −4+10, −28+35, −100, the gap −10+28 is created by removing the raw material fraction which would be retained on the three consecutive primary Tyler screens having 14 mesh per inch, 20 mesh per inch and 28 mesh per inch. The gap −35+100 is created by removing the raw material fraction which would be retained on the three consecutive primary Tyler screens having 48 mesh per inch, 65 mesh per inch, and 100 mesh per inch.

In preparing a batch for fabrication of refractory bricks, the size graded and proportioned raw materials are blended with a non-aqueous (preferably carbonaceous or waxy) binder and pressed to a green density of 170–190 pounds per cubic foot. Storage containers for both the raw materials and the pressed brick must be dry and sealed to the atmosphere to avoid hydration of the materials. Following brick fabrication and storage, the bricks are fired to 1600°C to bring about the ceramic bond.

PREFERRED EMBODIMENTS

Example 1

A number of bricks for use in the crash pad area of a basic oxygen furnace were pressed from a batch of:

| Constituent | Size (Tyler Mesh) | Amount (Percent of the batch) |
|---|---|---|
| Fused dolomitic grain | −4+10 | 45 |
| Fused dolomitic grain | −28+35 | 25 |
| Dead-burned Magmaster magnesite | −100 | 30 |

The −100 mesh MgO fraction actually includes, based on the whole batch, 25% −325 mesh particles. The size of the tapered brick varied from (in inches) 12 × (6−5) ×3 to 15 × (4 ½ − 3 ¾) × 3.

The dolomitic fused grain was obtained by crushing an electrically melted, fusion-cast billet produced from a batch of 70% Ohio Lime Company dolomite and 30% Magmaster MgO (Michigan Chemical Corp.). The oxide analysis of the fused grain was MgO 59.3%, CaO 40.3%, $Al_2O_3$ 0.2%, others 0.2% (FeO, $Cr_2O_3$, $SiO_2$). Typical analysis of the magnesite was MgO 98.5%, CaO 0.55%, $SiO_2$ 0.38%, others 0.44% ($Fe_2O_3$, $Al_2O_3$, $B_2O_3$), LOI 0.13%. Primary crushing of the fused billet was done with jaw crushers and secondary crushing with a hammer mill. Impact-type crushers which produce equiaxial (round) grains are preferred over roll-type crushers which produce sharp, flat particles.

The proportioned raw materials (fused grain and magnesite) were mixed with 3% (by weight) fluid paraffin wax binder at 60°C. for about 10 minutes. Bricks of the previously mentioned sizes were pressed while the batch remained at 60°C. Final densities ranged 180°–184 lbs/cu. ft.

Firing of the pressed ware was accomplished at 1600°C, for 16 hours at peak temperature. A portion of the bricks were tar impregnated using common techniques. Average properties of interest are shown in Table II.

Results of a commercial tar impregnated deadburned magnesite refractory which is currently in steel plant use are provided in Table II for comparison with the rebonded grain refractory of this invention. The magnesite refractory tested is sold by North American Refractories under the trade name of Nartar P.A.D.

TABLE II

| | Sized and Rebonded Grain Refractory | Nartar P.A.D. |
|---|---|---|
| Density | | |
| Green | 182 lb/cu.ft. | |
| Burned | 181 lb/cu.ft. | |
| Impregnated | 193 lb/cu.ft. | 197 lb/cu.ft. |
| Porosity | 16.4% | |
| Strength (Crushing) of Impregnated Brick | | |
| Room Temperature | 10,800 psi | 8,000 psi |
| 1360°C. | 6,600 psi | 6,150 psi |
| Strength (Modulus of Rupture) | | |
| Room Temperature | | |
| Burned | 2,455 psi | |
| Impregnated | 3,120 psi | 2,700 psi |
| 1340°C. | 1,495 psi | 1,280 psi |
| Shock Resistance | 20 cycles | 20 cycles |
| Electric Slag Test | | |
| Maximum Cut | 0.35 inch | 0.67 inch |

Herein, one cycle in the thermal shock test involved placing a 1 × 1 × 3 inch sample into a 1400°C preheated furnace, holding the piece in the furnace for 10 minutes, removing the test piece from the furnace, and placing it on a steel plate for 10 minutes at ambient temperature and pressure.

The slag test is a rather severe procedure devised to determine the relative corrosion resistance of various samples. In general, the particular slag under consideration contacts for a specified time a rotating laboratory furnace cavity which is constructed from the test refractories. An electric arc maintains the slag at a normal temperature of about 1750°C. The resistance is determined by measuring the depth of the slag cut into the refractory. A normalized value for the slag resistance is obtained by comparing the test bricks against a standard refractory used in the same slag test run. Volume change and weight loss are other convenient properties which can be monitored. In our particular test the slag had a composition of 20% FeO, 53.5% CaO, 21.5% SiO$_2$ and 5.0% Al$_2$O$_3$, giving a lime-silica ratio of 2.5.

Example 2.

Using the pressing procedure of Example 1, several bricks were prepared from a batch of:

| | |
|---|---|
| Dead-Burned dolomitic grain −4+10 mesh | 45% |
| Dead-Burned dolomitic grain −28+35 mesh | 25% |
| Dead-Burned Magmaster magnesite −100 mesh | 30% |

Again, the −100 mesh MgO fraction included a substantial quantity of −325 mesh fine particles; in this example, 22.5% based on the whole batch.

The gaps −10+28 mesh and −35+100 mesh in the particle size distribution are created by removing the material retained on three consecutive primary Tyler screens after a continuous sizing operation.

The dolomitic grain in this example is an intimately mixed and dead-burned mixture of 70% Basidox (Basic, Inc.) dolomite and 30% Michigan Chemical Magmaster magnesite. The Basidox dolomite is a dead-burned dolomite analyzing 57.7% CaO, 41.5% MgO, 0.5% SiO$_2$, 0.2% Al$_2$O$_3$, 0.1% Fe$_2$O$_3$ and trace B$_2$O$_3$. The −100 mesh MgO was ball milled for 2 hours before batching, thereby increasing the percent finer than 325 mesh from 53% (as received) to 75% of the MgO fine fraction.

The fired properties were as follows: porosity 17.9%, 1340°C MOR 1550 psi, and slag cut 0.42 inches (52% of the Nartar PAD standard in the slag test run despite the higher density of the standard refractory).

In the foregoing specification, all mesh sizes and screen openings are according to the Tyler series and all percentages are on the weight basis. The choice of the Tyler series is merely exemplary and used for convenience and not for limitation. Any other system may be used which can separate the raw material batch into discrete particle size fractions so that the appropriate fractions may be removed, thereby setting up the two defined gaps in the batch particle size distribution.

We claim:

1. A size-graded batch for the production of basic refractory bodies consisting essentially of, with percentages on the weight basis, a mixture of,
   dead-burned magnesite and at least one refractory grain consisting essentially of on the oxide basis 50–67% MgO and 33–50% CaO and selected from the group of dead-burned grain and fused grain,
   25–35% being a fine magnesite fraction whose particles are substantially all −100 Tyler mesh and composed of said dead-burned magnesite,
   20–30% being an intermediate refractory grain fraction whose particles are substantially all in the range of −4+65 Tyler mesh, substantially all at least 2 $\sqrt{2}$ times the size of the largest allowed particle in said fine magnesite fraction, and composed of said refractory grain, and
   40–50% being a coarse refractory grain fraction whose particles are substantially all in the range of −4+65 Tyler mesh, substantially all at least 2 $\sqrt{2}$ times the maximum allowed particle size in said intermediate refractory grain fraction and composed of said refractory grain.

2. The batch of claim 1 wherein at least 75% of the particles in said fine magnesite fraction are −325 Tyler mesh.

3. The batch of claim 2 wherein substantially all the particles in said intermediate refractory grain fraction are +35 Tyler mesh.

4. The batch of claim 3 wherein said refractory grain consists of at least 98% MgO plus CaO.

5. The batch of claim 1 wherein
   the particles of said intermediate refractory fraction are substantially all −28++35 Tyler mesh and,
   the particles of said coarse refractory fraction are substantially all −4+10 Tyler mesh.

6. The batch of claim 5 wherein at least 75% of the particles in said fine magnesite fraction are −325 Tyler mesh and said refractory grain are fused grain.

7. The batch of claim 6 wherein said refractory grain consists of at least 98% MgO plus CaO.

8. A compacted and burned refractory body composed essentially of the batch of claim 1.

9. A compacted and burned refractory body composed essentially of the batch of claim 7.

* * * * *